March 15, 1966 L. P. THOMAS 3,240,875
UNITARY CONTROL PROVIDING COMPLEMENTARY
CHANGES CONTRAST AND BRIGHTNESS
Filed May 6, 1963
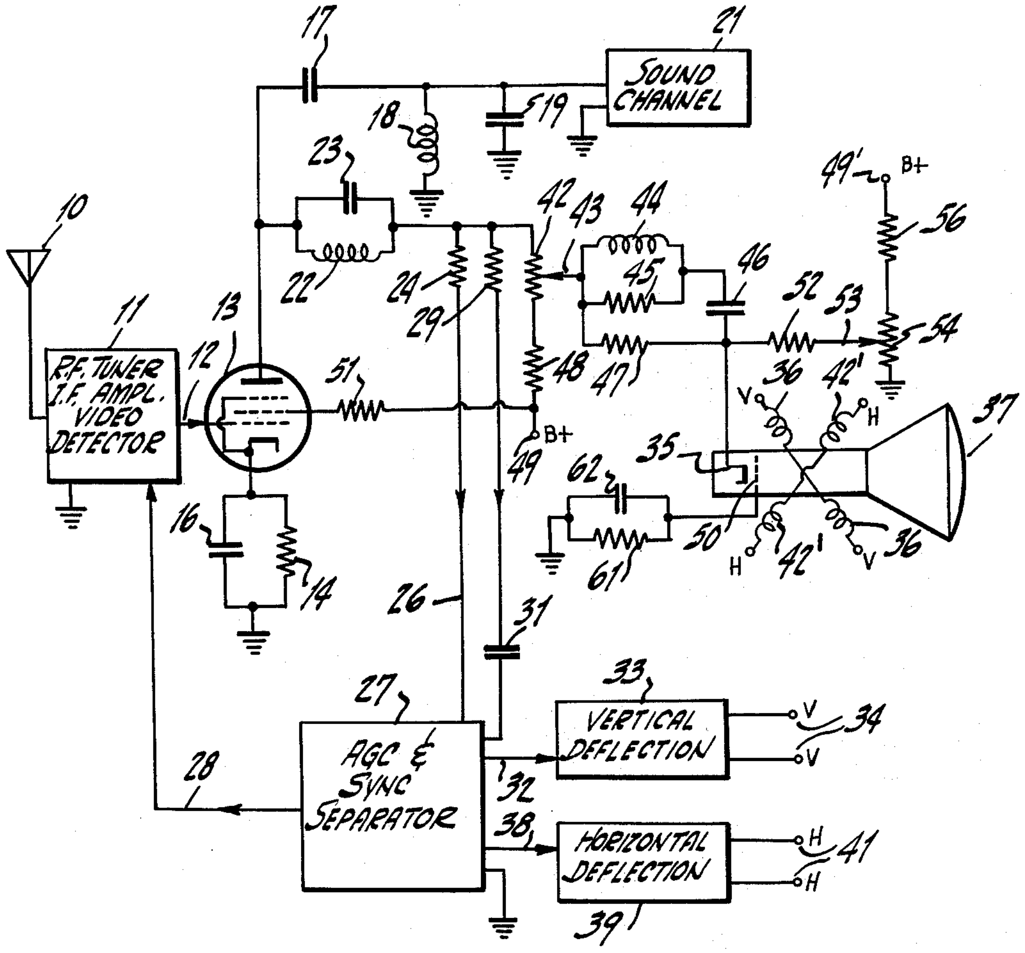
INVENTOR.
Lucius P. Thomas
BY
W. H. Sprague
Attorney United States Patent Office 3,240,875

Patented Mar. 15, 1966

3,240,875

UNITARY CONTROL PROVIDING COMPLEMENTARY CONTRAST AND BRIGHTNESS CHANGES

Lucius P. Thomas, Indianapolis, Ind., assignor to Radio Corporation of America, a corporation of Delaware Filed May 6, 1963, Ser. No. 278,165
9 Claims. (Cl. 178—7.5)

The present invention relates to an improved contrast and brightness control arrangement for television receivers. More particularly the present invention relates to a unitary contrast and brightness control for television receivers.

In most television receivers, controls are provided which permit the television viewer to adjust the displayed image for brightness and for contrast. The controls are generally manually adjusted in accordance with the subject matter of the televised image and the ambient light conditions. In addition the subjective influence of the viewer is a factor.

Most television viewers are not aware of the actual circuit changes taking place while the brightness and contrast controls are varied. The brightness control commonly includes a method of varying the direct current potential on one of the electrodes of the cathode ray tube and affects the brightness of the entire image. The contrast control commonly includes means for varying the amplitude of the video signals applied to the cathode ray tube so that the range between white and black in the displayed image is varied. It is not unusual for the viewer to sequentially adjust the brightness and contrast control knobs since the controls appear to be interdependent with respect to their effect on the image.

By utilizing the principles of the present invention it is possible for a viewer to adjust the brightness of the televised image to some desired level and then to have the brightness maintained at a corresponding level even with variations in the setting of the contrast control.

It is accordingly an object of the present invention to overcome the above-described disadvantages of prior art brightness and contrast control circuit arrangements.

A second object of the present invention is to provide a new and improved contrast and brightness control for television receivers.

It is another object of the present invention to provide a unitary brightness and contrast control for television receivers.

With the above objects in mind the present invention contemplates a unitary contrast control and brightness circuit arrangement for a television receiver having an image display device. A video amplifier is provided for producing amplified video signals for application to the image display device. A source of operating potential is included for the video amplifier. Variable impedance means are arranged between the source of operating potential and the video amplifier across which means is developed the amplified video signal to be applied to the image display device. A.C. and D.C. coupling means are provided between the variable impedance means and the image display device so that a change in the impedance of the variable impedance means produces complementary changes in both the amplitude of the video signal and the D.C. voltage applied to the image display device.

The novel features which are considered as characteristic for the invention are set forth in particular in the appended claims. The invention itself, however, both as to its construction and its method of operation together with additional objects and advantages thereof will best be understood from the following description of specific embodiments when read in connection with the accompanying drawing which is a schematic diagram partially in block form of a circuit incorporating the principles of the present invention.

Referring to the drawing, the composite signals transmitted by a television transmitter are received by an antenna 10 and applied to the block 11 representing the radio frequency (RF) tuner, the intermediate frequency (IF) amplifier and video detector of a television receiver. These stages of the television receiver may be constructed in any one of several conventional configurations and in themselves form no part of the present invention. Accordingly, additional details of block 11 are not illustrated in order to avoid unnecessarily complicating the drawing.

The output from the video detector of block 11 appears on the output conductor 12 and is applied to the control grid of a video amplifier tube 13. This output contains the video signal information to be amplified and applied to the cathode ray tube, the audio intermediate frequency signals and the horizontal and vertical synchronizing signals which make up the composite signal obtained at the antenna 10.

The cathode of tube 13 is connected to ground or the datum potential for the television receiver by the parallel combination of the cathode resistor 14 and bypass capacitor 16. The output signal from the anode of the video amplifier 13 is applied through coupling capacitor 17 and a video signal trap made up of inductor 18 and capacitor 19 to the block 21 representing the sound channel of the television receiver.

The sound channel 21 conventionally includes the sound IF circuits, the audio detector circuit and the audio output stages. Again, the circuits represented by the sound channel 11 in themselves form no part of the present invention and are not illustrated in order to avoid unnecessarily complicating the drawing.

The output signal from the anode of the tube 13 is also applied through the sound trap made up of inductor 22 and capacitor 23 to three different output circuits. The first includes resistor 24 and conductor 26 which applies the output to the block 27 representing the automatic gain control (AGC) and the synchronizing signal separator circuits of the television receiver. This output signal is applied to the automatic gain control portion of block 27, which circuit in turn produces an output automatic gain control signal on conductor 28 which is fed back to the IF amplifier circuit contained in block 11. The amplitude of the video signal information applied on conductor 26 to the AGC circuit determines the amplitude of the automatic gain control signal on conductor 28 so as to maintain the video output signal at a substantially constant level.

The second video signal output circuit from the tube 13 includes resistor 29 and a coupling capacitor 31 which applies the video signal output to the synchronizing signal separator circuit represented by the block 27. The sync separator separates the vertical synchronzing signals from this composite input and applies the vertical sync signals on conductor 32 to the vertical deflection circuit of the television receiver represented by the block 33. The vertical synchronizing signals applied to the vertical deflection circuit synchronize the generally sawtooth shaped current pulses appearing on output terminals 34 which are applied to the terminals V—V of the vertical deflection coils 36 of the cathode ray tube 37.

Also, the sync separator contained in the block 27 separates the horizontal synchronizing signals from the composite signal input and applies the horizontal sync signals on its output conductor 38 to the block 39 representing the horizontal deflection circuit of the television receiver. The horizontal deflection circuit in turn develops generally sawtooth shaped current pulses synchronized by the horizontal synchronizing signals and applies the same from its output terminals 41 to the terminals H—H of the horizontal deflection coils 42' of the cathode ray tube 37.

The circuits represented by the blocks 27, 33 and 39 may be constructed in any one of several conventional configurations and accordingly are not illustrated.

The third video signal output circuit from the tube 13 includes the contrast control potentiometer 42. This video signal output is taken from the tap 43 of potentiometer 42 and applied to the cathode 35 of cathode ray tube 37. This video signal output is applied by the A.C. coupling circuit made up of the parallel combination of inductor 44 and resistor 45 arranged in series with the coupling capacitor 46. The tap 43 of the contrast control potentiometer 42 is also direct current coupled to the cathode 35 of the cathode ray tube 37 by means of the resistor 47. The control grid 50 of the cathode ray tube 37 is connected to ground by resistor 61 and bypass capacitor 62.

The contrast control potentiometer 42 with a load resistor 48 serves as a portion of the D.C. anode load resistance for the amplifier 13. Load resistor 48 is connected between one end of potentiometer 42 and the positive terminal 49 of a source of direct current operating potential. Terminal 49 is also connected to the screen electrode of tube 13 by means of resistor 51.

The cathode 35 of the cathode ray tube 37 has a direct current potential applied thereto by means of the coarse brightness control circuit made up of resistor 52 connected to the tap 53 of brightness control potentiometer 54 and also by means of the direct current path through tap 43 and resistor 47. The potentiometer 54 is connected by means of resistor 56 between the electrical ground or the datum potential for the television receiver and the positive terminal 49' of the source of D.C. potential which may be the same as terminal 49. The D.C. potential between the cathode 35 and grid 50 determines the brightness of the image reproduced on the screen 37.

In operation, the composite signal transmitted by the television transmitter is received by the antenna 10 and mixed with local oscillations in the RF tuner circuit contained in the block 11. The resulting intermediate frequency is amplified by the IF amplifier and the video detector produces on the output conductor 12 a composite signal containing the video information, the horizontal and vertical synchronizing signals, the blanking pulses and the audio IF.

This composite signal is applied to the control electrode of the video amplifier 13 which produces at its anode an amplified composite signal. The audio intermediate frequency signal is coupled to the sound channel 21 by means of capacitor 17. The trap made up of inductor 18 and capacitor 19 prevents the video information from reaching sound channel 21.

Similarly, the trap made up of inductor 22 and capacitor 23 substantially eliminates the audio information, and the amplified video signal is applied to the AGC circuit and the synchronizing signal separator circuit contained in block 27 by means of resistors 24 and 49 respectively. The circuits represented by the block 27 provide AGC signals fed back on the output conductor 28 and vertical and horizontal synchronizing signals on conductors 32 and 38 respectively.

The vertical deflection circuit represented by the block 33 and the horizontal deflection circuit represented by the block 39 respectively produce vertical and horizontal scanning signals at output terminals 34 and 41. The scanning signals applied to the vertical and horizontal coils 36 and 42' control the reproduction of the televised image displayed on the screen of the cathode ray tube 37.

The video output signals are applied to the cathode 35 of the cathode ray tube 37 by means of the contrast control potentiometer 42, the RL combination of resistor 45 and inductor 44 and the coupling capacitor 46. The resistor 47 connected between the tap 43 and the cathode 35 is substantially larger in value than the resistor 45.

As with conventional receivers the television viewer varies the impedance of the brightness control potentiometer 54 between the cathode 35 and ground. The impedance of the contrast control potentiometer 42 between the cathode 35 and the anode of the tube 13 is also varied to provide together a displayed image having the brightness and contrast characteristics subjectively desired by the viewer. The impedance of potentiometer 54 between the cathode 35 and ground determines the overall brightness of the reproduced image while the impedance of the potentiometer 42 between cathode 35 and the anode of tube 13 determines the contrast between the light and dark portions of the image.

When the receiver is changed to a different channel, however, which may transmit television signals with a different percentage of modulation or when a new image having differently contrasting areas is displayed for any reason, the viewer may decide that readjustment is desirable. With the illustrated circuit the viewer may easily make a satisfactory adjustment by merely changing the position of the tap 43 of contrast control potentiometer 42. It should be noted that when the tap 43 is moved towards the positive terminal 49 of the source of operating potential, more of the video signal will be attenuated by the higher impedance of potentiometer 42 acting as the anode load resistor. At the same time the D.C. potential of the tap 43 increases. The brightness is controlled mainly by the voltage between the cathode 35 and the first grid 50 of the cathode ray tube. The grid 50 is at a negative D.C. potential with respect to the cathode 35, and may be at ground potential.

The net result is that a smaller amplitude video signal developing a smaller contrast between light and dark areas in the image is applied to the cathode 35 for display purposes. At the same time a higher (more positive) D.C. potential with respect to the control grid 50 is applied to the cathode 35, decreasing the brightness of the displayed image. A decrease in brightness is desired with decreasing contrast of the displayed image and vice versa. It is therefore clear that the tap 43 of the contrast control 42 provides a unitary adjustment of both the brightness and contrast in a manner found necessary and desirable by a discriminating television viewer.

It should therefore be rarely necessary to vary the coarse brightness control potentiometer 54 once the receiver has been installed in a particular television viewing area. Thereafter, both the brightness and contrast should be capable of complementary variation by the unitary control represented by the tap 43.

Without any intent to limit the scope of the present invention, a circuit utilizing the circuit components having the following values has been found to operate in the desired manner to produce a unitary control for brightness and contrast adjustments:

| | |
|---|---|
| Potential at terminal **49** ---------volts-- | 270 |
| Tube **13** ------------------------- | 11KV8 |
| Resistor **48** ---------------ohms-- | 1800 |
| Potentiometer **42** -------------do---- | 4000 |
| Resistor **45** ---------------do---- | 3300 |
| Inductor **44** ---------microhenries-- | 330 |
| Resistor **47** -------------megohms-- | 1 |
| Capacitor **46** ----------microfarads-- | 0.22 |
| Resistor **52** ---------------ohms-- | 100,000 |
| Potentiometer **54** -------------do---- | 200,000 |
| Resistor **56** ---------------do---- | 180,000 |
| Cathode ray tube **37** ---------------- | 19AYP4 |

While the present invention has been described with respect to a unitary brightness and contrast control for television receivers using a cathode ray tube, it is clear that the invention need not be limited to the specific illustrated circuit and that the new and improved arrangement may be used in other circuits for unitary control purposes without departing from the scope of the invention as defined by the following claims.

What is claimed is:

1. A unitary brightness and contrast control arrangement for a television receiver having an image display device, in combination, a video output stage of the television receiver for applying video signals to the image display device;

a source of D.C. operating potential for said output stage;

variable impedance means arranged in circuit between said source of operating potential and said output stage for varying the amplitude of said video signals transmitted to the image display device in accordance with variations of its impedance;

A.C. coupling means for coupling said video signals from said variable impedance means to the image display device; and D.C. coupling means arranged between said variable impedance means and the image display device for applying D.C. potential from said source to the image display device, whereby variation of said impedance of said variable impedance means produces complementary changes in the video signal and the D.C. potential applied to the image display device.

2. A unitary brightness and contrast control arrangement for a television receiver having a cathode ray tube, in combination, an output amplifier for applying video signals to an electrode of the cathode ray tube;

a source of D.C. operating potential connected in circuit with said output amplifier;

variable impedance means connected between said source of operating potential and said output amplifier;

A.C. coupling means arranged between said variable impedance means and said electrode of the cathode ray tube for varying the amplitude of said video signals in accordance with changes in the impedance of said variable impedance means; and D.C. coupling means arranged between said variable impedance means and said electrode of the cathode ray tube for varying the amplitude of the D.C. potential of said electrode in accordance with changes in the impedance of said variable impedance means, said respective amplitudes of said video signals and D.C. potential varying in an inverse manner for the same change in impedance.

3. A unitary brightness and contrast control arrangement for a television receiver having a cathode ray tube, in combination, an output tube of the television receiver having at least an anode, a cathode and a control electrode, said output tube being adapted to have video signals applied to said control electrode thereof and to produce at said anode electrode amplified video signals for application to the cathode ray tube;

a source of D.C. operating potential connected in circuit with said anode and cathode electrodes of said output tube;

variable impedance means arranged in series between said source of D.C. operating potential and said anode electrode of said output tube;

A.C. coupling means connected between said variable impedance means and the cathode ray tube for applying a portion of said amplified video signals to the cathode ray tube, the magnitude of said portion being determined by the impedance of said variable impedance means; and D.C. coupling means arranged between said variable impedance means and the cathode ray tube for transmitting a portion of said D.C. operating potential to the cathode ray tube, the magnitude of said portion of said D.C. operating potential being dependent upon said impedance of said variable impedance means, whereby a change in the impedance of said variable impedance means in a direction to increase the magnitude of said portion of amplified video signals applied to the cathode ray tube simultaneously decreases said portion of D.C. operating potential applied to the cathode ray tube.

4. A unitary brightness and contrast control arrangement for a television receiver having a cathode ray tube, in combination, an output tube of the television receiver having at least an anode, a cathode and a control electrode, said output tube being adapted to have video signals applied to said control electrode thereof and to produce at said anode amplified video signals for application to the cathode ray tube;

a source of D.C. operating potential connected in circuit with said anode and cathode electrodes of said output tube;

a potentiometer arranged in series between said source of D.C. operating potential and said anode electrode of said output tube, said potentiometer having a tap movable between a minimum impedance position and a maximum impedance position of said potentiometer;

A.C. coupling means connected between said tap of said potentiometer and the cathode ray tube for applying a portion of said amplified video signals to the cathode ray tube, the magnitude of said portion being determined by the position of said tap of said potentiometer; and D.C. coupling means arranged between said tap of said potentiometer and the cathode ray tube for transmitting a portion of said D.C. operating potential to the cathode ray tube, the magnitude of said portion of said D.C. operating potential being dependent upon the position of said tap of said potentiometer, whereby a change in the position of said tap of said potentiometer in a direction to increase the magnitude of said portion of amplified video signals applied to the cathode ray tube simultaneously decreases said portion of D.C. operating potential applied to the cathode ray tube.

5. A unitary brightness and contrast control arrangement for a television receiver having a cathode ray tube in combination, an output tube of the television receiver having at least an anode, a cathode and a control electrode, said output tube being adapted to have video signals applied to said control electrode thereof and to produce at said anode electrode amplified video signals for application to the cathode ray tube;

a source of D.C. operating potential connected in circuit with said anode and cathode electrodes of said output tube;

a potentiometer arranged in series between said source of D.C. operating potential and said anode electrode of said output tube, said potentiometer having a tap movable between a minimum impedance position and a maximum impedance position of said potentiometer;

A.C. coupling means connected between said tap of said potentiometer and the cathode ray tube for applying a portion of said amplified video signals to the cathode ray tube, the magnitude of said portion being determined by the position of said tap of said potentiometer; and D.C. coupling means arranged between said tap of said potentiometer and the cathode ray tube for transmitting a portion of said D.C. operating potential to the cathode ray tube, the magnitude of said portion of said D.C. operating potential being dependent upon the position of said tap of said potentiometer, whereby a change in the position of said tap of said potentiometer in a direction to decrease the magnitude of said portion of amplified video signals applied to the cathode ray tube simultaneously increases said portion of D.C. operating potential applied to the cathode ray tube.

6. A unitary brightness and contrast control arrangement for a television receiver having a cathode ray tube in combination, an output tube of the television receiver having at least an anode, a cathode and a control electrode, said output tube being adapted to have video signals applied to said control electrode thereof and to produce at said anode electrode amplified video signals for application to the cathode of the cathode ray tube;

a source of D.C. operating potential connected in circuit with said anode and cathode electrodes of said output tube;

variable impedance means arranged in series between said source of D.C. operating potential and said anode electrode of said output tube;

A.C. coupling means connected between said variable impedance means and the cathode ray tube for applying a portion of said amplified video signals to the cathode of the cathode ray tube, the magnitude of said portion being determined by the impedance of said variable impedance means; and D.C. coupling means arranged between said variable impedance means and the cathode ray tube for transmitting a portion of said D.C. operating potential to the cathode of the cathode ray tube, the magnitude of said portion of said D.C. operating potential being dependent upon said impedance of said variable impedance means, whereby a change in the impedance of said variable impedance means in a direction to increase the magnitude of said portion of amplified video signals applied to the cathode of the cathode ray tube simultaneously decreases said portion of D.C. operating potential applied to the cathode of the cathode ray tube.

7. A unitary brightness and contrast control arrangement for a television receiver having an image display device, in combination, a video output stage of the television receiver for applying video signals to the image display device for reproduction of the televised video image;

a source of D.C. operating potential for said output stage;

variable impedance means arranged in circuit between said source of operating potential and said output stage for varying the amplitude of said video signals in accordance with variations of its impedance, the contrast between light and dark portions of said reproduced image displayed on the image display device being related to said amplitude of said video signals; and coupling means arranged between said variable impedance means and the image display device for transmitting a portion of said amplitude of said video signals and a portion of said D.C. potential to the image display device, whereby variation of the impedance of said impedance means produces complementary changes between the contrast of the displayed image and the portion of D.C. potential applied to the image display device.

8. A unitary brightness and contrast control arrangement for a television receiver having a cathode ray tube, in combination, a video output amplifier of the television receiver for applying video signals to an electrode of the cathode ray tube to reproduce a televised image on the screen of the cathode ray tube, the contrast between the light and dark portions of said reproduced image being dependent upon the amplitude of the video signals applied to said electrode of the cathode ray tube;

a source of D.C. operating potential for said output amplifier;

a coarse brightness control arranged between said source of D.C. operating potential and said electrode of the cathode ray tube for applying a first portion of said D.C. operating potential to said electrode of the cathode ray tube to adjust coarsely the brightness of the displayed image;

variable impedance means arranged in series between said source of operating potential and said output amplifier for transmitting a portion of said video signals to said electrode of the cathode ray tube and for varying the amplitude of said portion of said video signals in accordance with variations of its impedance;

A.C. coupling means for coupling said portion of said video signals from said variable impedance means to said electrode of the cathode ray tube; and D.C. coupling means arranged between said variable impedance means and said electrode of the cathode ray tube for applying a portion of said source of D.C. operating potential to said electrode of the cathode ray tube, whereby variation of the impedance of said variable impedance device simultaneously varies both said portion of said video signals and said portion of said D.C. operating potential applied to said electrode of the cathode ray tube for simultaneously varying the contrast and brightness of the image displayed on the screen of the cathode ray tube.

9. A unitary brightness and contrast control arrangement for a television receiver having a cathode ray tube, in combination, a video output amplifier of the television receiver for applying video signals to an electrode of the cathode ray tube to reproduce a televised image on the screen of the cathode ray tube, the contrast between the light and dark portions of said reproduced image being dependent upon the amplitude of the video signals applied to said electrode of the cathode ray tube;

a source of D.C. operating potential for said output amplifier;

a potentiometer arranged in series between said source of D.C. operating potential and said anode electrode of said output tube, said potentiometer having a tap movable between a minimum impedance position and a maximum impedance position;

A.C. coupling means connected between said tap of said potentiometer and the cathode ray tube for applying a portion of said amplified video signals to the cathode ray tube, the amplitude of said portion being determined by the position of said tap on said potentiometer, said A.C. coupling means including a capacitor and the parallel combination of an inductor and a first resistor, said parallel combination being arranged in series with said capacitor between said tap of said potentiometer and the cathode ray tube; and a second resistor having a substantially larger resistance than said first resistor and arranged between said tap of said potentiometer and the cathode ray tube for applying a portion of said D.C. operating potential to the cathode ray tube, whereby variation of the position of said tap of said potentiometer simultaneously varies both said portion of said video signals and said portion of said D.C. operating potential applied to the cathode ray tube for simultaneously varying the contrast and brightness of the image displayed on the screen of the cathode ray tube.

References Cited by the Examiner

UNITED STATES PATENTS

| | | | |
|---|---|---|---|
| 2,522,967 | 9/1950 | Shaw | 178—7.5 |
| 3,136,849 | 6/1964 | Wilmarth | 178—7.5 |

DAVID G. REDINBAUGH, *Primary Examiner.*

Disclaimer 3,240,875.—*Lucius P. Thomas*, Indianapolis, Ind. UNITARY CONTROL PROVIDING COMPLEMENTARY CONTRAST AND BRIGHTNESS CHANGES. Patent dated Mar. 15, 1966. Disclaimer filed Oct. 25, 1973, by the assignee, *RCA Corporation*.

Hereby enters this disclaimer to claims 1–9 of said patent.

[*Official Gazette February 19, 1974.*]